E. R. HILL AND J. W. MARSH.
TRUCK.
APPLICATION FILED AUG. 25, 1919.

1,388,816. Patented Aug. 23, 1921.
5 SHEETS—SHEET 1.

WITNESSES

INVENTOR
Ernest R. Hill
John W. Marsh
BY
Kerr, Page, Cooper & Hayward
ATTORNEYS

E. R. HILL AND J. W. MARSH.
TRUCK.
APPLICATION FILED AUG. 25, 1919.

1,388,816. Patented Aug. 23, 1921.
5 SHEETS—SHEET 4.

E. R. HILL AND J. W. MARSH.
TRUCK.
APPLICATION FILED AUG. 25, 1919.

1,388,816.

Patented Aug. 23, 1921.
5 SHEETS—SHEET 5.

WITNESSES
V. E. Winthrop
J. C. Ledbetter

INVENTOR
Ernest R. Hill
John W. Marsh
BY
Kerr, Page, Cooper & Hayward
ATTORNEYS

UNITED-STATES PATENT OFFICE.

ERNEST R. HILL, OF EAST ORANGE, NEW JERSEY, AND JOHN W. MARSH, OF NEW YORK, N. Y.

TRUCK.

1,388,816.  Specification of Letters Patent.  Patented Aug. 23, 1921.

Application filed August 25, 1919. Serial No. 319,620.

*To all whom it may concern:*

Be it known that we, ERNEST ROWLAND HILL, residing in the city of East Orange, county of Essex, State of New Jersey, and a citizen of the United States, and JOHN W. MARSH, a subject of George V, King of Great Britain and Ireland, and residing in the city of New York, borough of Manhattan, county of New York, State of New York, have invented a new and Improved Truck, of which the following is a full, clear, and exact description.

This invention relates to railway rolling stock, more particularly locomotives, and its chief object is to provide a truck for use in connection with locomotives and the like, especially large heavy locomotives of great wheel base or length, to permit extensive lateral movement or side swing of the locomotive frame over the truck and over the track during travel around a curve, thus enabling long locomotives to negotiate sharper curves than has been generally practicable heretofore.

A further object of the invention is to provide a locomotive truck which includes centering means for pulling the engine frame around the curve in order to draw the locomotive driving wheels off the tangent line which they tend to follow when taking a curve.

Another object of the invention is to provide a truck of simple construction, which can be incorporated in locomotives or other rolling stock of different types, by means of which rolling stock of unusual length or wheel base can be used regardless of short curves in the track, and which, particularly when employed in large locomotives, permits same to take comparatively short curves at higher speeds and with a greater factor of safety.

A further object of the invention is to provide a truck which can be used with rolling stock of the usual kind without necessitating material alterations in the construction thereof, which effectively counteracts the tendency of the locomotive or the like to maintain a tangential course when traversing a curve, and which minimizes the wear of track railway and wheels at such curves.

A feature of the invention resides in a system of swing links interposed between the locomotive frame and the truck frame to induce a lateral component effective to draw the engine frame and locomtive drivers off the tangent and around the curve.

In locomotive design it has been and is the practice to increase the overall length of a locomotive, necessarily, in order to increase the power thereof, and heretofore it has been difficult to expand the length of a locomotive because undue lengthening thereof causes the frame to swing across the track farther than could be accommodated by the present form of trucks used. It is a purpose to present in this disclosure an improved truck design which will permit a greater side swing or lateral motion of the locomotive frame over the truck thereby rendering possible the construction of a locomotive of greater length and power, without taking into consideration standard track curvature.

This truck has particular advantage and utility in connection with electric locomotives. Electric locomotives frequently require more space to accommodate the various power elements than do some locomotives of other types. The present radial truck permits the design and production of an electric locomotive of greater length and consequent power, since the excessive side swing of each end of the locomotive frame is accommodated by this truck, which performs its supporting function regardless of the degree of side swing.

With the above and other objects in view, the invention has relation to several truck designs as set forth in the appended claims, and an improved design and embodyment of which is described in the following specification, and portrayed in the accompanying drawings, wherein;

It is the usual practice in locomotive construction to mount a truck at one or both ends of the engine frame, that is to say one truck ahead of the drivers, and the other truck behind the drivers. Each truck is connected to the locomotive frame and swings to steer or draw the locomotive drivers around track curves. In the present description and drawings it is assumed that the truck under discussion is associated with the front end of the locomotive, it being obvious however that the same truck may be reversed and applied to the rear end of the locomotive frame.

A radial truck constructed according to the preferred form of our invention makes use of an ordinary wheel and axle set, but employs a specially designed axle box therewith. Truck yokes, capable of a swinging motion transversely of the truck, are mounted over the axle boxes and joined by equalizers. One end of a radius bar is joined to the axle boxes while the other end of said radius bar is fulcrumed on the under side of the engine frame. Provision is made on the truck to support the outer ends of the driving wheel equalizer set usually found on the locomotive in present day use. Accessory links and other parts are employed to complete the structure.

We make provision for swinging the truck yokes over the axle boxes and for accommodating the several movements of the parts related thereto, by employing an approved, specially designed, supporting base for the truck yoke, as disclosed in an application of John W. Marsh, Serial No. 336,317, filed in the United States Patent Office on the 7th day of November, A. D. 1919. Other obvious types of yoke mounts, or supporting boxes which will adequately function and care for the various mechanical conditions which arise due to the use of swingable yokes, over the axle box, may likewise be employed in connection with this combination radial truck as presented herein.

Referring now more in particular to the drawings for a detailed discussion of our invention, the reference numeral 9 indicates a yoke radius bar extending forward and integrally forming a one-piece structure with a truck frame 10. The yoke radius bar has an integral projection or fulcrum lug 8 formed on the back end thereof, and this lug is provided with a hole to receive a fulcrum pin as later seen when the truck is joined up with the locomotive frame. The truck frame 10 is shaped to approximate the form of a yoke and receives therebetween the wheel and axle set of the truck. Each forward end of the truck frame supports an axle box 12, the boxes being securely bolted thereto as disclosed in the front view of Fig. 3. The axle box is journaled on the truck axle 14 in the usual way and the wheels 15 are shrunk on the truck axle and disposed on the inside of the axle boxes as ordinarily practised in car construction.

A truck yoke consists of the outspread and downwardly directed arms 16 integrally cast with an open or hollow casing 17. The yoke casing 17 is closed at the top and left open on the bottom thereof where the yoke associates with means to support it over the axle box. A plate spring 18 is bound with a band 19 and inserted in a rocker 36 which forms the spring support. The spring and related rocker are movably confined within the yoke casing 17 with adequate clearance between the upper part of the casing and the spring in order to permit relative movement of the spring and rocker 36 within the truck yoke. At this point it suffices to say that the truck yokes are swung over the axle boxes, their lower ends being capable of transverse motion relative to the said boxes. The yoke arms are channeled in cross section and each admits the lower end of a spring hanger 22, pivoted to the yoke arm on a pin 23. The upper ends of the hanger are inserted through slots formed through each end of the spring 18, and a gib 24 is locked through the hanger to confine it in suspended position under the spring. In this manner the yoke is suspended from the spring and supported thereon while the spring itself is mounted indirectly upon the axle box through a specially designed support hereinafter more fully described. The lower end of each yoke arm is bufurcated, and a bearing hole drilled through the spaced furcations, the purpose of which is pivotally to receive equalizer members as later described. The weight of the engine will be imposed on the yoke and transferred through the hangers 22 to the spring and thus to the axle and wheels.

Figure 1:
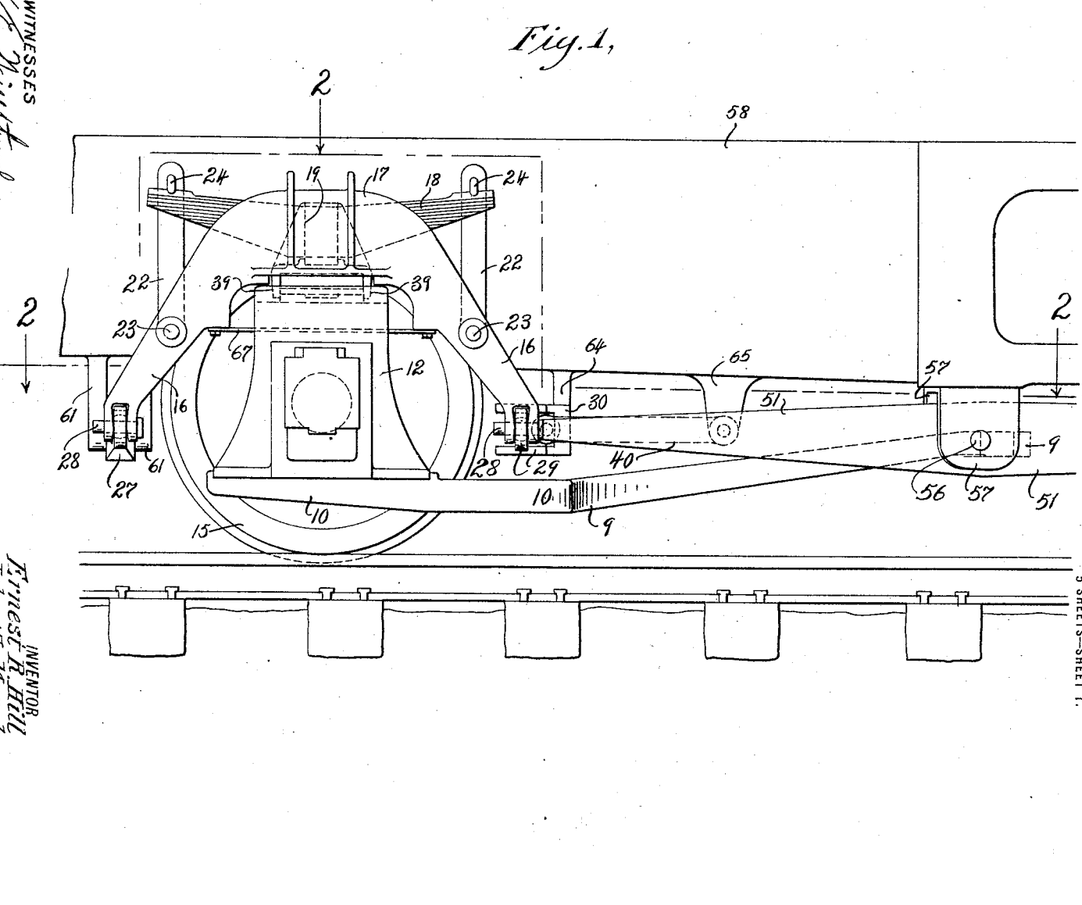
Figure 1 shows the radial truck in side elevation with one end of the locomotive frame mounted above the truck.
Figure 2:
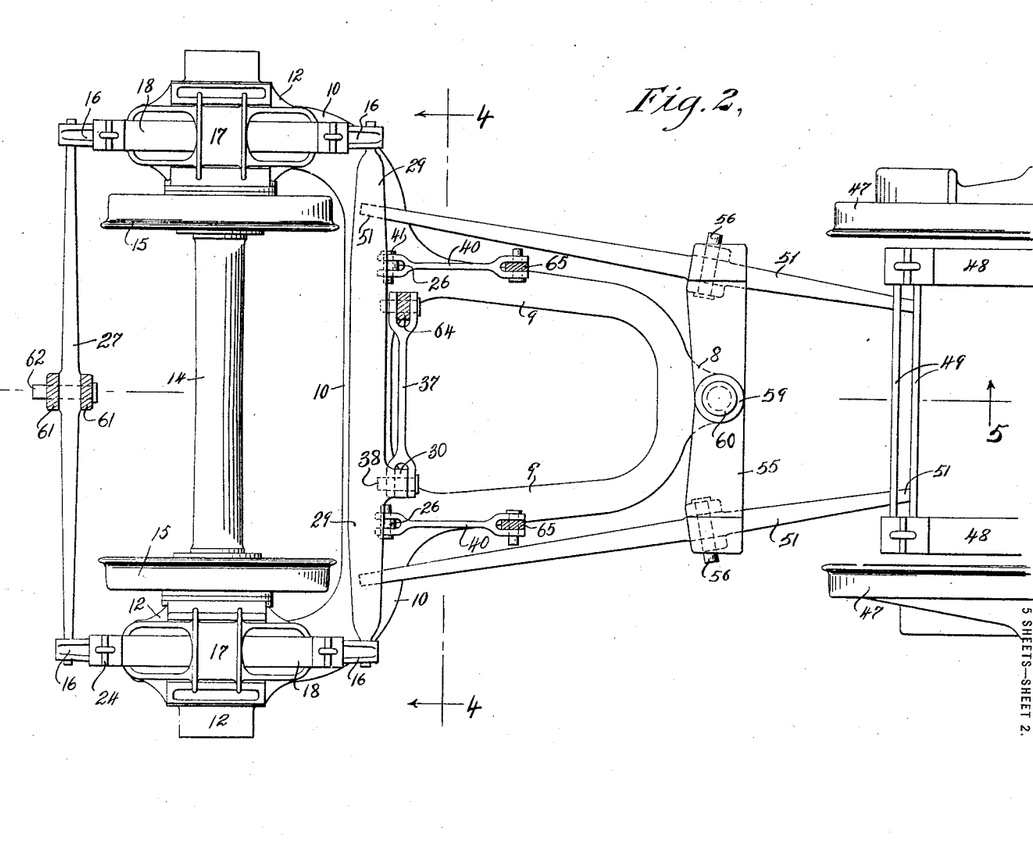
Fig. 2 illustrates a plan view of the locomotive truck. This view is developed from the line of section 2—2 of Fig. 1, and discloses sectioned parts of the locomotive frame which has been removed to show the general organization of parts in plan.
Figures 4, 6, 7:
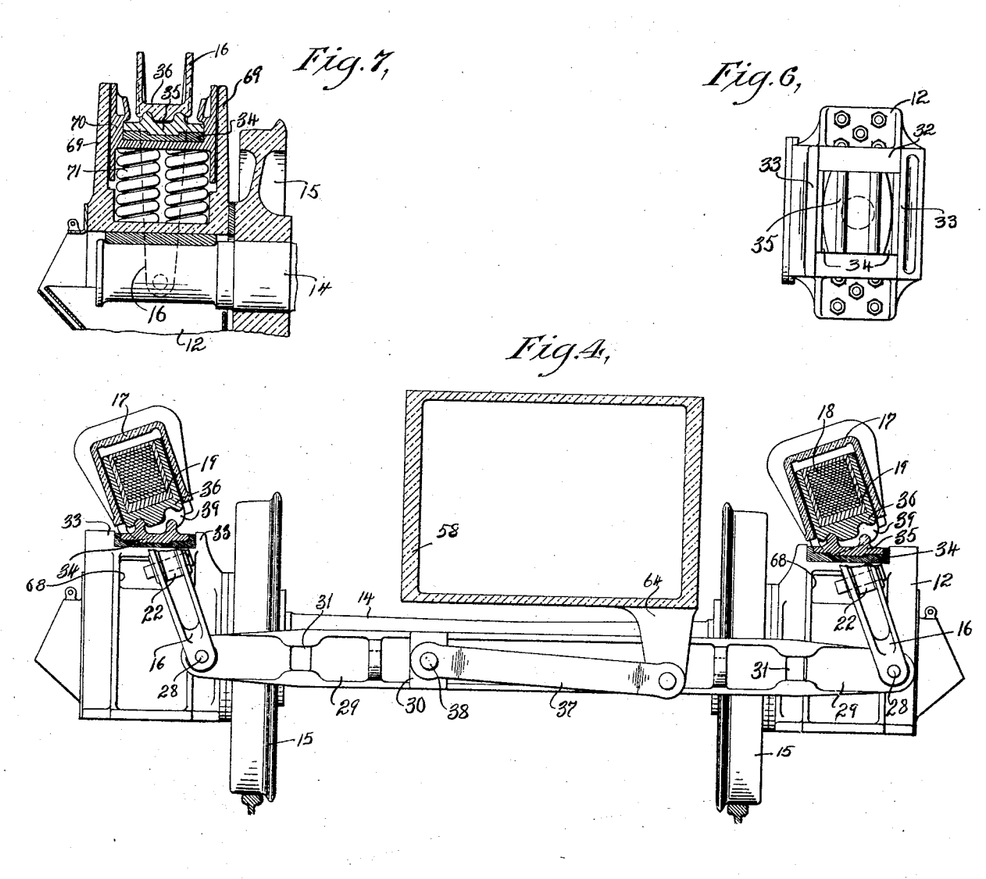
Fig. 4 illustrates a rear view of the truck with the truck frame and radius bar removed, as developed from the line 4—4 of Fig. 2, and discloses the laterally swung position of the truck linkage when the locomotive is rounding a curved track. The truck yokes are shown in section to illustrate their position relative to the axle box.
Fig. 6 discloses a plan view of the axle box and associated parts removed from the truck.
Fig. 7 illustrates a helical spring mount presented as a modified design which may be substituted for the plate spring mount preferably employed.

Observing the plan view Fig. 2, a front cross equalizer 27 is pivotally swung on the front of the yokes on pins 28. A truck equalizer 29 is likewise pivotally hung on the yoke arms. The pivotal connection of the front equalizer 27 and truck equalizer 29 with the yoke arms is provided with a ball and socket joint inserted in an enlarged bore formed in each end of the equalizer in the usual manner, and the pins 28 are inserted through the yoke and ball joints of the equalizer members. This permits the equalizer members to undergo a two motion movement with the yokes, that is to say, the equalizer may undergo a slight rotary movement on the ball and socket joint and likewise a free lateral movement on the pins. The front cross equalizer 27 is provided with a bore located in the center thereof to receive projecting lugs of the locomotive frame as later seen. The truck equalizer 29 is provided with openings 31, as best seen in Fig. 4. Two such openings are provided in order to receive and support the equalizers reaching forward from the driver springs of the locomotive as will be understood when the truck is hooked up with the locomotive frame. A fulcrum web 30 is integrally cast with the truck equalizer 29 and drilled to receive a fulcrum pin 38. Likewise, fulcrum webs or ears 26 are formed on the truck equalizer and drilled to receive fulcrum pins 41 for carrying links as later seen. The two equalizers hold the truck yokes in proper spaced relation over the axle boxes.

Figure 3:
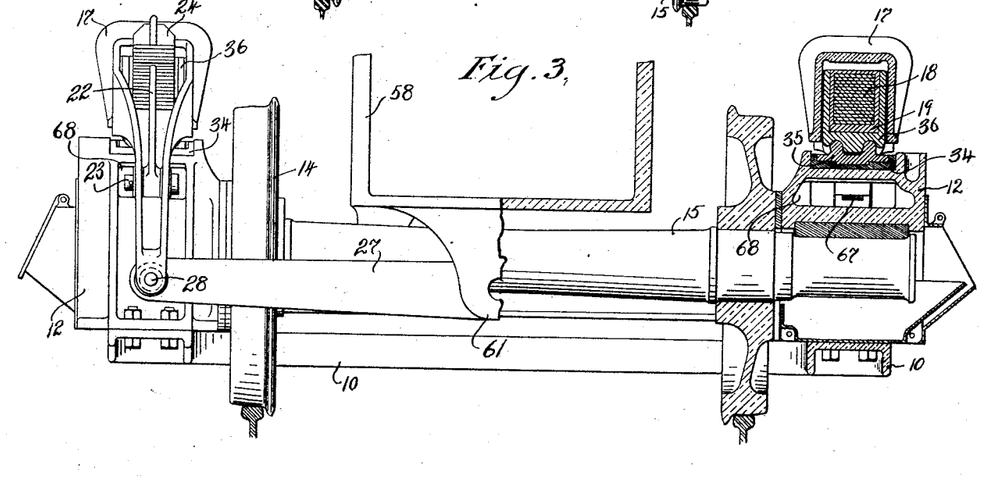
Fig. 3 illustrates a front view of the truck shown in combination sectional and elevation. This view portrays the position of all parts when the locomotive and truck is on a straight track, and shows the frame of the locomotive carried upon the track.

The upper part of the axle boxes are specially designed to accommodate the swinging truck yokes. The boxes are finished across the upper face thereof to provide a sliding surface 32 with upstanding parallel guide flanges 33, as seen in Fig. 6. A slide 34 is confined on the sliding surface 32 which permits the axle box to move relatively to the slide. The slide supports a rocker base 35, said base having arcuate sides seen in Fig. 6, and a boss on the bottom thereof fitting into a depression formed in the slide. This allows the slide 34 to swivel or rotate about and under the rocker base 35. The rocker base is provided with upstanding parallel ribs which register with grooves of similar configuration formed in the lower face of the rocker 36 which carries the spring 18 as previously described. The rocker 36 is provided with overhanging lips 39 in order to confine the parts 34 and 35 in immovable relation with the truck yoke when the axle box moves or travels under the slide 34. Fig. 3 shows the relation of the rocker normally equalized over the rocker base when the truck travels on a straight track and shows the grooves of the rocker resting on all ribs of the rocker base; while in Fig. 4 the truck is rounding a curve and the truck yokes swing transversely across the track which causes each rocker to tilt up and rest upon one of the ribs of the rocker base. The front cross equalizer and the truck equalizer swing back and forth with the engine frame and maintain the lower ends of the truck yokes in spaced and alined order during the motion of the yokes over the axle boxes. Other functions of the cross and truck equalizer will later appear.

A side thrust link 37 has forked ends, and one end is pivoted on the fulcrum web 30 of the truck equalizer by employing the pin 38; and end thrust links 40 are pivoted on the fulcrum ears 26 by the pins 41. The several links 37 and 40 provide means for hooking up the truck equalizer with the locomotive frame for maintaining the truck as a complete unit in alined proper working relation with the locomotive frame as hereinafter described.

With a view of facilitating the reader's understanding of our invention, a summary will be given in this paragraph of certain well known locomotive parts old in the art and with which it is customary to associate a radial truck. The locomotive drivers are designated by the reference numeral 47, and the driving wheel springs 48 are mounted adjacent the drivers. The springs are joined in spaced relation by cross equalizer bars 49. The usual form of driving wheel equalizer set is swung beneath the cross equalizer bars, and consists of what is known as equalizers 51 to the driving wheels. These equalizers 51 are well shown in Figs. 2 and 5. The necessary linkage is provided to support the rear ends of the equalizers 51 beneath the cross equalizer bars. This linkage consists of the hanger 52 carried on the forward end of each spring 48 and supporting links 53, the links in turn supporting the cross equalizer bars 49. Hangers 54 are usually pinned between the bars and are slotted on the lower ends to receive the rear ends of the equalizers 51 to drivers which are hooked into the hangers. A bolting plate 55, shown in plan on Fig. 2, is fulcrumed over the driving wheel equalizer set by pins 56 passed through lugs 57 integrally cast with the bolting plate. Each equalizer 51 is therefore pivotally mounted beneath the bolting plate, and reaches forward to rest on a member of the truck.

The bolting plate merely forms a part of the locomotive frame superimposed above the truck and driving wheel. The locomotive frame is designated by the reference numeral 58 and the bolting plate 55 is securely bolted thereto. The front end of the frame has the depending lugs 61 bored to receive a pin, and to the rear of these lugs are provided similar lugs 64 and 65. The bolting plate 55 is provided with integral fulcrum bosses 59 spaced apart to receive the radius bar lug 8 of the truck. The fulcrum bosses are fitted with a heavy fulcrum pin 60. It is seen how, in locomotive practice, the rear end of the driving wheel equalizer set is swung from the driver springs while the forward end of this equalizer set must necessarily be accommodated by the radial truck.

In coupling up this truck to the locomotive proper the equalizers to drivers are hooked into the openings 31 of the truck equalizer and rest therein. The fulcrum lug 8 of the yoke radius bar is introduced between the bosses 59 of the bolting plate and fulcrumed on the pin 60. Thus the truck frame and radius bar are fulcrumed beneath the engine frame through the swing point fulcrum connection and the radius bar 9 functions to hold the truck in proper relation with the engine frame. The lugs 61 on the forward end of the locomotive reach down on each side of the front cross equalizer 27 and pivotally join therewith through a pin 62. The lug 64 depending from the locomotive frame pivotally connects with the side thrust link 37, and the lugs 65 pivotally connect with the end thrust links 40. Pins are used for coupling up the several links with the lugs of the frame. It is seen how the truck yokes 16 with assembled equalizers 27 and 29 are joined up with the locomotive frame, the side thrust link 37 fuctioning to hold the truck yokes against lateral forces while the end thrust links 40 act to restrain the equalizers and yokes against longitudinal forces, yet allow a certain vertical movement, or up and down play, relatively to the locomotive frame due to track irregularities.

In this manner the weight of the forward portion of the locomotive is distributed through the front cross equalizer 27 to the truck yokes onto the springs and thence to the axle boxes, and through the truck equalizer 29 to the equalizer set 51, and rearwardly through these equalizers to the driving wheel springs 48.

When the truck is moving on a straight track the position of the truck yokes and associated parts assumes that position shown in Fig. 3 and there are no appreciable lateral forces exerted through the side thrust link 37; but when the locomotive and truck are traveling around a curve as in Fig. 4 the truck wheels follow the track, carrying with them the truck boxes 5 with the elements 34 and 35 forming the spring support. This action carries over the top of the truck yokes with the rocker 36, tilting each one upon one of the ribs of its rocker base. This causes the weight on each yoke to be carried through a diagonal line, the horizontal component of which represents the lateral force the truck exerts to pull the engine frame around the curve.

When the truck swings around the fulcrum point 60 there are, in addition to the lateral motions, longitudinal and twisting motions impressed against the truck relatively to the engine frame. The truck equalizer 29 must be maintained in alinement with all parts of the locomotive frame in order to preserve its supporting connection with the equalizer set 51 to drivers. This result is attained through the agency of the end thrust links 40.

In order to join the truck yokes and axle boxes together so the truck will not fall apart when lifted on or off the track during the assembly or repair thereof, a lifting bar 67 is passed through a specially provided opening 68 formed through the top portion of the axle box and fixed to the yokes. The lifting bar 67 performs the function in the operation of the truck of supporting the wheels and axle when the truck is lifted in the shop and of preventing the elements from jumping apart during excessive vibration while running.

Fig. 7 presents a slightly modified form of axle box in order to accommodate helical springs should it become necessary to employ these rather than plate springs. The axle box is provided with upstanding guides 69, and a cross head 70 is movably confined and free to move up and down in the guides, with a nest of helical springs 71 interposed between the slide and the axle box. The cross head is supported by the springs, and in turn carries the slide 34 and the rocker base 35. The rocker 36 rests on the projections or ribs of the rocker base 35, and in this design the truck yoke and rocker base are made a one piece structure.

Figure 8:
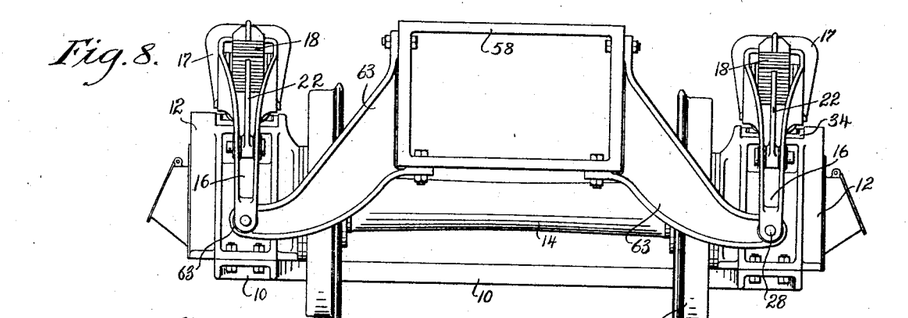
Fig. 8 shows a modified design of the truck mounting when a locomotive frame is connected directly to the truck yoke instead of to a front cross equalizer.

On certain types of locomotives it will be more practical to eliminate the front cross equalizer 27 and to connect a locomotive frame 58 directly to the yokes 16. This is accomplished preferably by employing a construction similar to that disclosed in Fig. 8. In this view the same locomotive frame 58 is shown and the forward supporting lugs 61 are omitted, likewise the cross equalizer bar 27 is omitted. The locomotive frame is provided with rigid arms 63 bolted to, or otherwise made rigid with, the engine frame 58. These arms extend downwardly and outwardly from the locomotive frame and connect with the lower and forward arms of each truck yoke similar to the pivotal connection 28 heretofore described for the front cross equalizer 27.

We wish to point out that the truck of our invention is capable of special uses, such for example, as with military railway rolling stock. For instance it can be advantageously employed for the mobile mounts of long and heavy coast defense or siege artillery pieces.

Figures 5, 9, 10:
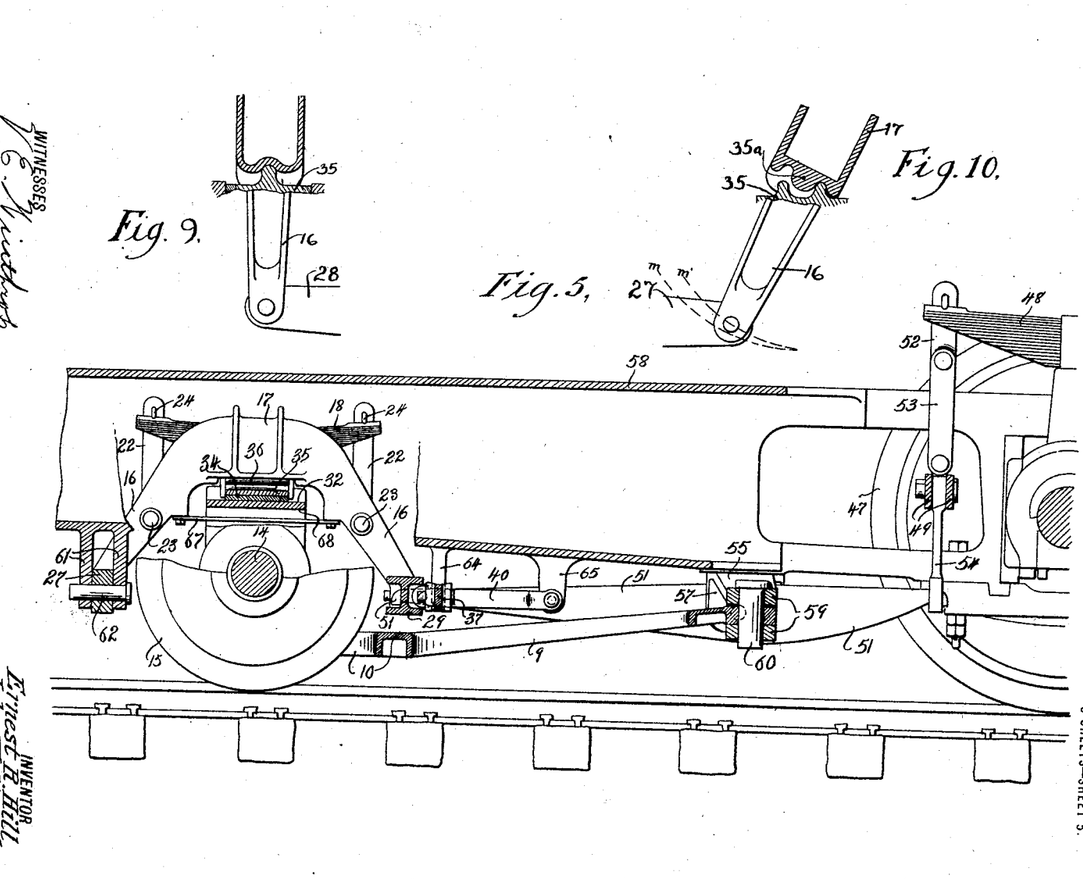
Fig. 5 shows a longitudinal sectional view of the locomotive truck as developed from the section line 5—5 of Fig. 2. In this view the locomotive frame is mounted over and upon the truck, and in section through the center thereof to disclose the truck yoke, links and other associated elements.
Fig. 9 is a detail view, partly in cross section, illustrating a construction in which the truck yoke is mounted to swing on a single point over the axle box.
Fig. 10 is a detail view, partly in cross section, illustrating a construction in which the truck yoke is mounted on a pair of ribs on the axle box.

As will be seen in Figs. 3 and 7, the yoke 16 rests on two ribs on the rocker base 35 and is provided for that purpose with two longitudinal grooves coöperating with the ribs, thus constituting what may for convenience be termed a two-point suspension. We may, however, use a one-point suspension, as for example the form illustrated in Fig. 9. The other method is preferred, chiefly for the reason illustrated in Fig. 10. In this figure, if the yoke were pivoted as indicated in Fig. 9 so as to swing on the point $35^a$ as a center, the path of the yoke arms would, in general, be as indicated by the dotted arc $m$. On the other hand, with the two-point suspension the path of the yoke arms is on the arc $m'$; and it will be observed that in the latter case there is an appreciable vertical component at the commencement of the travel tending to rock the yoke back to its initial position, which component is in general negligible with the yokes swinging on arc $m'$. This initial component serves to prevent lateral swaying of the engine over the truck, which is encountered when using the one-point suspension, as indicated for example, in Fig. 9 and is usually remedied by centering springs (not shown) which are under initial compression and aid in restoring the yokes to their normal positions.

Having thus described our invention, what we claim as new and desire to secure by Letters Patent is:

1. A radial truck for locomotives, comprising in combination; a railroad wheel and axle set, axle boxes journaled thereon, a yoke pivoted upon each axle box pivotally connected with a locomotive and capable of rocking motion transversely of the track upon which the truck runs, and a radius bar rigidly joined with the axle boxes.

2. A radial truck for locomotives, comprising in combination; a railroad wheel and axle set, a one piece radius bar and frame, axle boxes rigidly mounted upon the one piece radius bar and frame and journaling the wheel and axle set, a truck yoke pivoted upon each axle box and capable of a rocking transverse motion across a track on which the truck runs.

3. A radial truck for locomotives, comprising in combination; a railroad wheel and axle set, axle boxes journaled thereon, a yoke mounted over each axle box pivotally connected with a locomotive capable of motion transversely of the track upon which the truck runs, and so arranged that the yoke may rock upon the axle box, and a radius bar rigidly joined with the axle boxes.

4. A radial truck for locomotives, comprising in combination; a railroad wheel and axle set, a one piece radius bar and frame, axle boxes rigidly mounted upon the one piece radius bar and frame and journaling the wheel and axle set, a truck yoke pivoted upon each axle box and capable of a rocking transverse motion across a track on which the truck runs, equalizer members pivotally connected with the truck yokes, and means associated with the equalizer members for hooking up the truck to a locomotive.

5. A radial truck, comprising in combination; a railroad wheel and axle set, a one piece radius bar and frame, axle boxes rigidly mounted upon the one piece radius bar and frame and journaling the wheel and axle set, a plate spring mounted upon each axle box, a truck yoke suspended on the plate spring and capable of swinging motion transversely across the track upon which the truck runs.

6. A radial truck, comprising in combination; a railroad wheel and axle set, a frame, a radius bar rigidly connected with the frame, axle boxes mounted rigidly on the frame and journaling the wheel and axle set, a spring mounted over each axle box, a truck yoke supported on the spring and capable of swinging motion transversely across the track on which the truck runs, and equalizer members pivotally connected with the truck yokes.

7. A radial truck for locomotives which ordinarily have equalizers reaching out from the locomotive drivers, said truck comprising in combination; a wheel and axle set, a truck frame, a radius bar connected with the truck frame, axle boxes rigidly mounted on the truck frame and journaling the wheel and axle set, a truck yoke swingingly mounted over each axle box, a front cross equalizer pivotally carried by the yokes, and a truck equalizer pivotally carried by the yokes to receive the equalizers which reach out from the locomotive drivers.

8. A radial truck for locomotives comprising in combination; a wheel and axle set, a truck frame, a radius bar connected with the truck frame, axle boxes rigidly mounted on the frame and journaling the wheel and axle set, a plate spring disposed across the top of each axle box, a truck yoke pivotally connected to the locomotive and suspended on the plate spring and so arranged that the truck yoke and spring may tilt upon the axle box.

9. A truck, comprising in combination; a wheel and axle set, a truck frame, a radius bar in the form of a yoke joined with the truck frame, axle boxes mounted on the truck frame and journaling the wheel and axle set, a truck yoke mounted over each axle box and adapted to rock thereupon, and equalizer members pivotally connected with the truck yokes to carry the truck's share of the weight of the locomotive.

10. A truck, comprising in combination; a wheel and axle set, a truck frame, a radius bar joined to the truck frame, axle boxes mounted on the truck frame and journaling the wheel and axle set, a truck yoke mounted over each axle box and capable of rocking thereupon, and equalizer members pivotally connected with the truck yokes to carry the truck's share of the weight of the locomotive.

11. A truck, comprising in combination; a wheel and axle set, a truck frame, a radius bar in the form of a yoke joined with the truck frame, axle boxes mounted on the truck frame and journaling with the wheel and axle set, a plate spring disposed across the top of each axle box, a truck yoke suspended on each plate spring and so associated with said spring that the spring and yoke are capable of undergoing a transverse rocking motion over the axle box, and equalizer members pivotally connected with the truck yokes to carry the truck's share of the weight of the locomotive.

12. A truck, comprising in combination; a wheel and axle set, a truck frame, a radius bar joined to the truck frame, axle boxes mounted on the frame and journaling the wheel and axle set, a plate spring disposed across the top of each axle box, a truck yoke suspended on each plate spring and so associated therewith as to permit a tilting movement of the spring and yoke over the axle boxes, and equalizer members pivotally connected with the truck yokes to carry the truck's share of the weight of the locomotive.

13. A truck to connect with the frame of a locomotive, comprising in combination; a wheel and axle set, a truck frame, a radius bar in the form of a yoke joined with the truck frame, axle boxes mounted on the truck frame and journaling the wheel and axle set, a truck yoke mounted over each axle box and adapted to swing thereupon, and equalizer members pivotally connected with the truck yokes to carry the truck's share of the weight of the locomotive, and means interposed between the locomotive frame and the equalizer members to hold the equalizer members in alinement with the frame of the locomotive.

14. A truck to connect with the frame of a locomotive, comprising in combination; a wheel and axle set, a truck frame, a radius bar joined to the truck frame, axle boxes mounted on the truck frame and journaling the wheel and axle set, a truck yoke mounted over each axle box and capable of swinging thereupon, and equalizer members pivotally connected with the truck yokes to carry the truck's share of the weight of the locomotive, and means interposed between the locomotive frame and the equalizer members to hold the equalizer members in alinement with the frame of the locomotive.

15. A truck to connect with the frame of a locomotive, comprising in combination; a wheel and axle set, a truck frame, a radius bar in the form of a yoke joining with the frame, axle boxes mounted on the truck frame and journaling the wheel and axle set, a plate spring disposed across the top of each axle box, a truck yoke suspended on each plate spring and so associated with said spring that the spring and yoke are capable of undergoing a swinging motion over the axle box, and equalizer members pivotally connected with the truck yokes to carry the truck's share of the weight of the locomotive, and means interposed between the locomotive frame and the equalizer members to hold the equalizer members in alinement with the frame of the locomotive.

16. A truck to connect with the frame of a locomotive, comprising in combination; a wheel and axle set, a truck frame, a radius bar joined to the truck frame, axle boxes mounted on the truck frame and journaling the wheel and axle set, a spring disposed across the top of each axle box, a truck yoke suspended on each spring and associated therewith to permit a tilting movement of the associated spring and yoke over the axle boxes, and equalizer members pivotally connected with the truck yokes to carry the truck's share of the weight of the locomotive, and means interposed between the locomotive frame and the equalizer members to hold the equalizer members in alinement with the frame of the locomotive.

17. A truck to connect with the frame of a locomotive, comprising in combination; a wheel and axle set, a truck frame, a radius bar in the form of a yoke joined with the truck frame, axle boxes mounted on the truck frame and journaling the wheel and axle set, a truck yoke mounted over each axle box and adapted to swing or rock thereupon, and equalizer members pivotally connected with the truck yokes to carry the truck's share of the weight of the locomotive, a side thrust link connected with the equalizer members and to the locomotive frame, and an end thrust link connected with the equalizer members and to the locomotive frame.

18. A truck to connect with the frame of a locomotive, comprising in combination; a wheel and axle set, a truck frame, a radius bar joined to the truck frame, axle boxes mounted on the truck frame and journaling the wheel and axle set, a truck yoke mounted over each axle box and capable of swinging thereupon, equalizer members pivotally connected with the truck yokes to carry the truck's share of the weight of the locomotive, a side thrust link connected with the equalizer members and to the locomotive frame, and an end thrust link connected with the equalizer members and to the locomotive frame.

19. A truck to connect with the frame of a locomotive, comprising in combination; a wheel and axle set, a truck frame, a radius bar in the form of a yoke joining with the truck frame, axle boxes mounted on the truck frame and journaling with the wheel and axle set, a plate spring disposed across the top of each axle box, a truck yoke suspended on each plate spring and so associated with said spring that the spring and yoke are capable of undergoing a swinging motion over the axle box, equalizer members pivotally connected with the truck yokes to carry the truck's share of the weight of the locomotive, a side thrust link connected with the equalizer members and to the locomotive frame, and an end thrust link connected with the equalizer members and to the locomotive frame.

20. A truck to connect with the frame of a locomotive, comprising in combination; a wheel and axle set, a truck frame, a radius bar joined to the truck frame, axle boxes mounted on the truck frame and journaling the wheel and axle set, a plate spring disposed across the top of each axle box, a truck yoke suspended on each plate spring and so associated therewith as to permit a tilting or rocking movement of the associated spring and yoke over the axle boxes, equalizer members pivotally connected with the truck yokes to carry the truck's share of the weight of the locomotive, a side thrust link connected with the equalizer members and to the locomotive frame, and an end thrust link connected with the equalizer members and to the locomotive frame.

21. A truck to connect with the frame of a locomotive, which ordinarily has equalizers reaching out from the driver springs thereof, said truck comprising in combination; a railroad wheel and axle set, a frame, a radius bar joined to the frame, axle boxes mounted on the frame and journaling the wheel and axle set, a spring mounted over each axle box, a truck yoke disposed over the spring and supported thereupon capable of a tilting motion over the axle box, a front cross equalizer pivotally connected with the yokes, a truck equalizer pivotally connected with the yokes, the engine frame adapted to be supported upon the front cross equalizer, and means employed in connection with the truck equal to receive and support equalizers which reach from the locomotive drivers, a side thrust link connected with the truck equalizer and with the locomotive frame, end thrust links connected with the truck equalizer and locomotive frame.

22. A truck, comprising in combination; a railroad wheel and axle set, a frame, a radius bar connected therewith, axle boxes rigidly mounted on the frame said axle boxes provided with an opening formed therethrough, a yoke hung over each axle box, equalizers pivotally connected with the yokes, and a lift bar inserted through the opening formed in the axle box and fixed to the yoke to lift the wheel and axle set.

23. In railroad truck construction comprising; a wheel and axle set, an axle box provided to journal the wheel and axle set, said axle box provided with an opening formed therethrough, a member mounted across the axle box adapted to a pivot or rock thereon, and a lift bar inserted through the opening of the axle box and attached to the member.

24. In a truck, a wheel and axle set having an axle box, equalizing mechanism associated with said set, and a rocking yoke carried by said box, and connected with said mechanism.

25. In a truck, a wheel and axle set, equalizing mechanism associated therewith, and means connecting said set and said mechanism, and capable of transverse rocking movement, whereby said set and said mechanism are relatively movable transversely of the line of travel of the truck.

26. In a truck for locomotives, a wheel and axle set having axle boxes, a yoke mounted to rock transversely on each box, a spring carrying each yoke, means for connecting each of said springs to the locomotive, equalizing mechanism, and means connecting said yokes and said mechanism.

In testimony whereof we hereunto affix our signatures.

ERNEST R. HILL.
JOHN W. MARSH.